Patented Aug. 14, 1945

2,382,641

UNITED STATES PATENT OFFICE 2,382,641

PREPARATION OF LIMONENE

Morris S. Kharasch, Chicago, Ill., and William Bryan Reynolds, Cincinnati, Ohio, assignors to Research Corporation, New York, N. Y., a corporation of New York No Drawing. Application August 21, 1944, Serial No. 550,486

8 Claims. (Cl. 260—675.5)

This invention relates to the preparation of limonene from pinene and more particularly to a process for preparing limonene by heating pinene with an organic acid in the presence of an organic acid amide.

It is well known that pinene, when heated with organic acids, is converted into esters of borneol. As by-products of such conversion small quantities of active limonene are produced. However, yields are never large since acids which cause limonene to be produced are readily esterified by the pinene, such esters forming the principal products of the reaction.

When optically active pinene is heated to temperatures above 200° C., it isomerizes thermally to produce dl-limonene, commonly known as dipentene. A satisfactory process for the production of limonene from pinene should therefore take place at temperatures below 200° C.

The invention has as an object the preparation of d- or l-limonene, in good yield, from the corresponding d- or l-alpha or beta pinene. A further object is the catalytic isomerization of pinene to limonene by organic acids under conditions largely preventing the esterification of the acids.

These objects are accomplished by heating pinene with organic acids in the presence of organic acid amides at temperatures below 200° C.

When pinene is heated with organic acids, esters of borneol are obtained. Yields of esters obtained depend upon the temperature and the particular acid used. Weak organic acids such as acetic and benzoic give poor yields of esters when temperatures of the order of 140° C. are used. However, higher yields are obtained at temperatures of 175 to 200° C. When somewhat stronger organic acids such as chloroacetic acid, m-nitro benzoic, benzoylbenzoic, and salicylic are used, the yields of ester obtained at 140° C. are quite good. The same acids and conditions which bring about good yields of ester are also effective in catalytically converting pinene to limonene. However, limonene cannot be commercially prepared by such a process since the yields are low. In the present invention it has been discovered that the esterification of the acids by pinene can be inhibited without materially inhibiting the capacity of the acids to isomerize the pinene to limonene. Agents which will thus inhibit the esterification reaction are quite specific and, for practical purposes, are limited to the class comprising organic acid amides. The organic acid amide used may be the amide of the same acid used as isomerization catalyst or it may be an amide of a different acid. Examples of amides which can be used are, formamide, acetamide, benzamide and salicilamide. In addition, certain agents can be used which form amides by reacting with the acid used as isomerization catalyst. Such agents are exemplified by ammonia and urea.

In carrying out the process of the present invention, pinene is heated at temperatures of from 120° to 200° C. with an organic acid and an organic acid amide for a period of time varying from a few to as much as fifty hours, depending upon the reagents and temperature chosen. The reaction mixture is steam distilled to obtain the terpene, which may contain as much as seventy or eighty per cent active limonene plus a little unreacted pinene and a small amount of by-product. The pure limonene is obtained by fractionating the crude terpene. The residue from the steam distillation is made alkaline with caustic and heated to hydrolyze the amide. After clarification of the solution, the acid is recovered in good yield by acidifying the solution and filtering off the precipitated acid.

The invention is further illustrated by the following examples:

Example 1 d-alpha-pinene, 136 parts (one mole), is heated with benzoylbenzoic acid, 113 parts (0.5 mole), and formamide, 18 parts (0.4 mole) for forty hours at 140±2° C. The reaction mixture is steam distilled to recover 128 grams of terpene. Fractionation of the crude terpene yields 20 grams of unreacted pinene and 95 grams of d-limonene, B. R. 174–78° C., $n_D^{22}$ 1.473, $d_4^{20}$ 0.841, observed rotation in 1 dcm. tube +48.1°. The benzoylbenzoic acid is recovered by heating the residue from the steam distillation with caustic, clarifying the solution and precipitating the acid by the addition of mineral acid. Acid recovery is good.

Example 2 d-alpha-pinene, one mole, is heated with salicylic acid, 0.2 mole, and acetamide, 0.18 mole, for forty hours at 150±2° C. The reaction mixture is worked up as described in Example 1. The amount of unreacted pinene in this example was 69 grams, while 50 grams of d-limonene were obtained. In addition, three grams of borneol were obtained after saponification of the residue from the steam distillation.

Example 3 d-alpha-pinene, one mole, is heated with benzoic acid 0.4 mole, and formamide 0.35 mole, at a temperature of 180±2° C. for fifteen hours. The reaction mixture is worked up as in the previous examples. The yield of limonene is 75 grams. The limonene obtained in this example contains a small amount of dipentene.

Example 4 d-alpha-pinene, one mole, is heated with benzoylbenzoic acid, 0.4 mole, and urea 0.15 mole, for forty hours at 140±2° C. The reaction mixture is worked up and limonene recovered by the method described in the previous examples. The yield of limonene is 50% of theory.

Example 5

Same as Example 1, except that beta-pinene is used in place of alpha-pinene. The yield of limonene is comparable.

Example 6

Same in Example 1, except that l-alpha-pinene is used in place of d-alpha-pinene. In this example, l-limonene is formed as the principal product of the reaction.

Example 7

Same as Example 2, except that monochloroacetic acid, 0.2 mole, is used in place of salicylic acid. The yield of d-limonene is somewhat better than in Example 2.

The term "pinene" has been used in this specification to include all members of the class comprising d-alpha-pinene, l-alphapinene, d-betapinene, and l-betapinene. As starting material for the preparation of d-limonene, d-alphapinene and d-betapinene are equivalent and as starting material for the preparation of l-limonene, l-alpha-pinene and l-betapinene are equivalent. The isomerization of pinene to limonene is a proton catalyzed reaction and the function of the organic acid in the process depends on the presence of the carboxylic acid group —COOH. The character of the radical attached to the —COOH group is important only as it affects the ionization of the carboxylic acid and thus effects the velocity of the reaction. The term "organic acid" therefore includes any compound of the type R—COOH where R— is an organic radical. Di- and polybasic acids are also included. The term "organic acid amide" includes any compound of the type R—CONH$_2$ where R— is an organic radical. Such an amide is preferably preformed and added to the reaction mixture. However, an equivalent procedure is to add some reagent to the reaction mixture, which will produce organic acid amides in situ. For example, ammonia may be passed into the hot reaction mixture. In either instance, a part of the acid used for the catalytic isomerization is converted into the corresponding amide. The term "in the presence of an organic acid amide" therefore includes both the addition of the preformed amide or the formation of the amide in the reaction mixture.

We claim:

1. The process for the production of limonene which comprises heating pinene with an organic acid in the presence of an organic acid amide.

2. The process for the production of limonene which comprises heating pinene at a temperature of from 120° C. to 200° C. with an organic acid in the presence of an organic acid amide.

3. The process for the production of d-limonene which comprises heating a substance of the group consisting of d-alpha-pinene and d-beta-pinene with an organic acid in the presence of an organic acid amide.

4. The process for the production of l-limonene which comprises heating a substance of the group consisting of l-alpha-pinene and l-beta-pinene with an organic acid in the presence of an organic acid amide.

5. The process for the production of limonene which comprises heating pinene with an organic acid in the presence of an aliphatic acid amide.

6. The process for the production of limonene which comprises heating pinene with benzoylbenzoic acid in the presence of an aliphatic acid amide.

7. The process for the production of limonene which comprises heating pinene with salicylic acid in the presence of an aliphatic acid amide.

8. The process for the production of limonene which comprises heating pinene with chloroacetic acid in the presence of an aliphatic acid amide.

MORRIS S. KHARASCH.
WILLIAM BRYAN REYNOLDS.